April 21, 1964 J. R. CONNELLY ETAL 3,130,317
PHOTOSENSITIVE LUMINOUS ANNULAR SIGHT
Filed Nov. 1, 1961
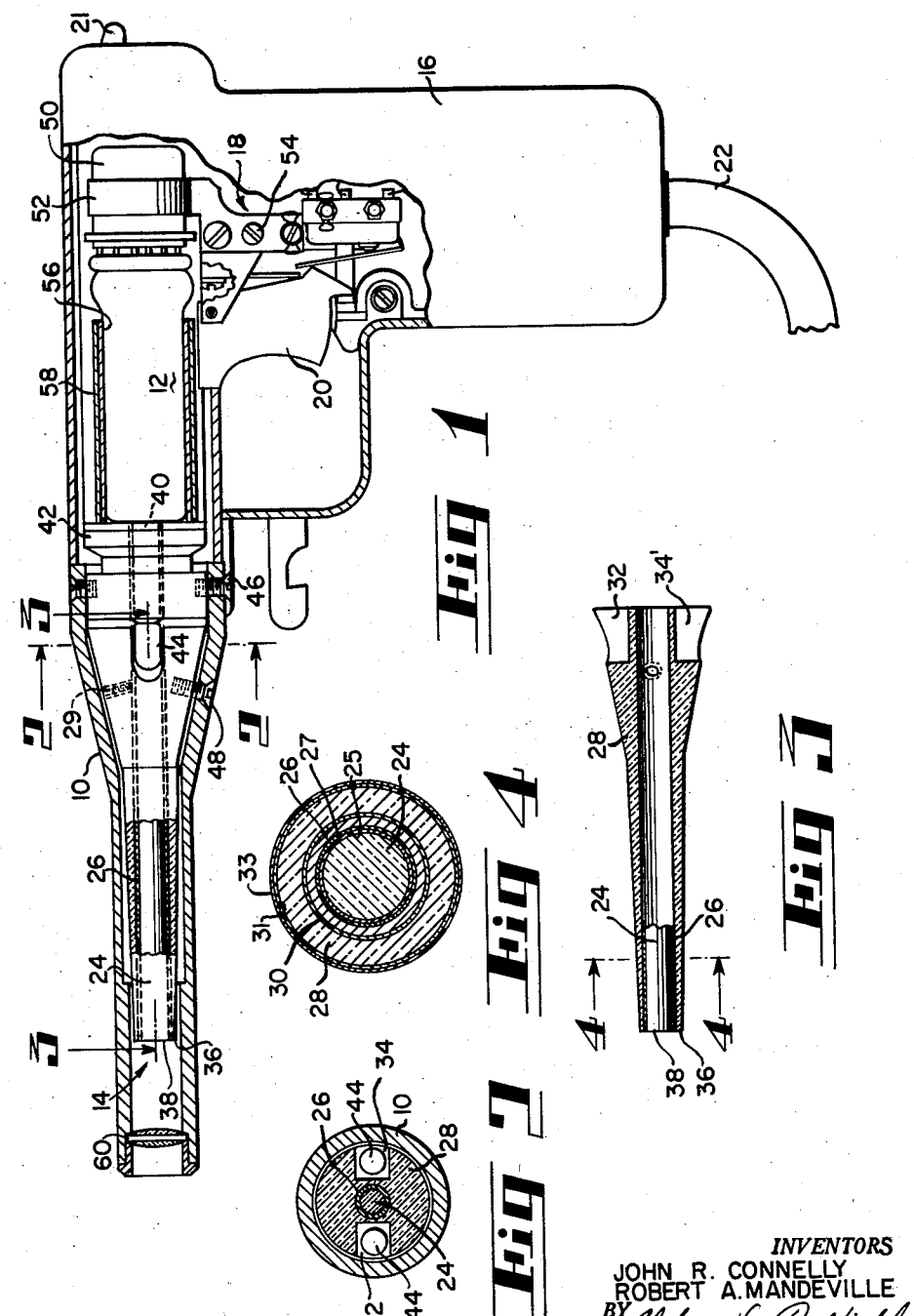
INVENTORS
JOHN R. CONNELLY
ROBERT A. MANDEVILLE
BY
ATTORNEYS United States Patent Office 3,130,317
Patented Apr. 21, 1964

3,130,317
PHOTOSENSITIVE LUMINOUS ANNULAR SIGHT
John R. Connelly, Cleves, and Robert A. Mandeville,
Byesville, Ohio, assignors to Avco Corporation, Cincinnati, Ohio, a corporation of Delaware
Filed Nov. 1, 1961, Ser. No. 149,406
11 Claims. (Cl. 250—227)

This invention relates to light-detecting devices and more particularly to a visual aid for accurately aiming a light detector at a low intensity light source.

In many applications it is necessary to accurately position or aim a light sensitive pick-up device with respect to a low intensity spot of light. For example, in one air traffic control system using a PPI radar scope, the target aircraft under control appear as small luminous spots on the face of a cathode-ray tube. In that system, many such spots may be present, and if they are closely spaced, it is necessary to aim the light detector with extreme accuracy to select the correct target. This invention provides the required aiming means for a light detector used in connection with a radar air traffic control system, but it finds equal utility in microscopes and other similar lens system-object alignments of many types where extreme accuracy is required.

The technique of tracking radar targets may involve the specific acquisition of a single target from several indicated on the face of the cathode-ray tube. As is known, these targets appear as luminous spots on the face of the cathode-ray tube, the spot being produced by the application of an electronic impulse to the intensity control grid of the cathode-ray tube at the instant the target return is detected at the radar receiver. If a light detector is directed towards the residual spot on the face of the cathode-ray tube, then it will be activated at the instant of the target detection, and the indication derived from the light detector may be used to "acquire" or to set up a computer for tracking the specific target. The present invention relates to a visual aid for aiming the light detector for accurate acquisition of a selected target.

In the prior art, acquisition devices using light detectors exhibit poor accuracy in specific target acquisition, and this creates a serious problem where the radar targets are relatively close together on the presentation. It is, therefore, the primary object of this invention to provide novel means for accurately positioning such a detector. More specifically, it is an object of this invention to project an annular luminous ring about the desired target spot when the detector is accurately aimed.

Another object of this invention is to provide two coaxial light conductors such that a pilot light source is projected in an annular luminous ring about a luminous control spot for accurate light pick-up from said spot.

Another object of this invention is to accurately aim a light detector at a luminous spot of light by projecting a pilot source of light from the direction of the detector to encircle the spot with a luminous annular ring, and in providing means for preventing the detection of the luminous annular ring.

Still another object of this invention is to provide a light-conducting rod having one end adjacent a light detector and the other end adapted to be aimed at a low intensity spot of light, and a tubular light-conducting member positioned about the rod and coaxial therewith for directing a ring of light towards the spot, and means focusing the spot on the rod, and means for focusing the ring of light on the plane of the spot.

For further objects and for a more detailed description of the precise nature of this invention, reference should now be made to the following detailed specification and to the accompanying drawings in which:

FIG. 1 illustrates a preferred form of the detector partly in section in accordance with this invention;

FIG. 2 is a cross-sectional view taken through the line 2—2 in FIG. 1;

FIG. 3 is a partial cross-sectional view of the preferred form of light conductors, with certain parts broken away, taken through the line 3—3 in FIG. 1; and FIG. 4 is an enlarged cross-sectional view taken through the line 4—4 in FIG. 3.

Briefly described, this invention comprises a light-detecting device designed to project a small ring of light so as to indicate the proper positioning of the detector for light pick-up from specific target illumination on displays such as the PPI scope of a radar. The light detector is properly aimed on the target when the target spot of illumination is wholly within the periphery of the ring of aiming light. The means for projecting the ring of light comprises a light-conducting tube or pipe through which light originating within the housing of the detecting device is transmitted, an axially aligned lens being positioned for proper focusing of the ring about a target spot. The means for detecting the spot of light includes a photo-multiplier which communicates with the spot through a light-conducting rod positioned inside the pipe but light insulated therefrom. Energization of the photo-multiplier may be used to trigger a gate for a computer or other similar device.

A preferred embodiment of this invention comprises a light detector with its unique aiming devices and associated electronic circuitry enclosed in a pistol-shaped casing. The casing includes a tubular enclosure 10, resembling the barrel of a pistol, for containing a light detector which is in the form of a photo-multiplier 12, and unique light-conducting elements generally indicated at 14 for transmitting and receiving light. The photo-multiplier 12 is located in the "breech end" of the barrel-type enclosure 10, while the elements 14 are located in the "muzzle" end. A pistol-type handle enclosure 16 extending from the breech end of the tubular enclosure 10 contains electronic circuitry, generally indicated at 18, for processing electrical indications produced by the photo-multiplier 12. A trigger 20 and a button 21 control energization of the various electrical and electronic components of the detector and the associated display from a convenient source (not shown) through a bundle of wires 22. Preferably the enclosures 10 and 16 are constructed of electrical insulating heat conducting materials and in practice, Du Pont nylon Zytel 105 was used.

The light-conducting elements 14 consist of two light-conducting channels comprising a transparent light-receiving rod 24 made of a transparent acrylic plastic material. As seen in FIG. 4, the surface of the rod is painted first with a coat 25 of white reflecting paint and then with a coat 27 of opaque lacquer. The rod 24 is encased in a thin beryllium copper sleeve 26, preferably provided with an overlap sliding joint to maintain spring tension for very close contact with the rod. The rod 24 with the sleeve 26 is then tight fitted into a hollow transparent acrylic plastic tube or pipe 28, one or more set-screws 29 extending through the thickness of the pipe 28 serving to retain these elements in place. A connection (not shown) to the electrical ground of the detector is made for electrically grounding the sleeve 26.

The light-conducting pipe 28 is constructed with a cylindrical bore of a size to firmly receive the rod 24 and beryllium sleeve 26, but the external configuration of the pipe 28 is generally in the form of aligned truncated cones, the portion adjacent the "breech" end of the device being enlarged to permit placement of two diametrically opposed lamp-accommodating holes 32 and 34. As shown only in FIG. 4, which is an exaggerated enlargement, the entire internal surface of the pipe 28 is provided with a coat 30 of white reflecting paint. Moreover, except for the surfaces surrounding the holes 32 and 34, the external surface of the pipe 28 has a first coat 31 of white reflecting paint and a second coat 33 of an opaque lacquer. The surfaces surrounding the holes 32 and 34 are clear, and the ends 36 and 38 of the pipe 28 and rod 24, respectively, are polished.

It will be noted that the ends 38 and 36 of the rod and pipe are flush but the other end 40 of the rod extends beyond the pipe and abuts the light input opening of the photomultiplier 12. A lamp base housing 42 mounted on the rod 24 and sleeve 26 is positioned intermediate the pipe 28 and the photo-multiplier 12. Two lamps 44 which are plugged into the lamp base housing extend into the holes 32 and 34 in the pipe 28. Although not shown, the lamp base housing 42 contains conventional electrical connectors for energizing the lamps 44 when connected to the power source. The entire assembly, including the optical elements 14 and lamp base housing 42, is secured within the tubular enclosure 10 by means of screws 46 and 48. Because of the confined space for the lamps 44 within the enclosure 10, the lamp base housing 42 is constructed of a material which is both an electrical insulator and a heat conductor. A suitable material for this purpose was Du Pont nylon Zytel 105.

The photo-multiplier 12 is plugged into and supported by a suitable socket 50 which is rigidly secured to the casing by means of a clamp 52 and screws 54. The photo-multiplier 12 is shielded with a cylindrical electrostatic shield 56 of beryllium copper which in turn is covered with an electrical insulator 58.

A crown glass double convex lens 60 is mounted in the "muzzle" end of the tubular enclosure 10 in axial alignment with the rod 24 and pipe 28 and spaced from the end thereof a distance equal to its focal length. The lens 60 is preferably coated to reduce reflected light.

In operation, the lamps 44 are normally illuminated and the multiplier 12 and other electronic circuitry 18 are operatively biased. Since the rod 24 is light-insulated from the lamps 44 by means of the several coats of paint and the electrostatic shield 26, and since the surfaces of the holes 32 and 34 are unpainted and clear, light does not travel down the rod 24 but does travel down the pipe 28 and out to the polished end 36. The light traveling out of the pipe is gathered by the lens 60 which acuminates a torus or ring of light on the display, the display surface being spaced from the lens 60 at a distance approximately equal to its focal length. If the display surface is moved closer to the end of the pipe 28, the ring becomes smaller, while movement away enlarges the ring. If the torus or ring projected from the pipe 28 and the lens 60 encircles a spot of light such as a target indication on a PPI radar scope, then the lens 60 will gather this light and focus the selected spot onto the light-conducting rod 24. The light from the ring, since it is not radiating outwardly, is not reflected back into the rod 24 but is dispersed. The threshold level of the multiplier 12 is usually adjusted so that the light picked up from a normal target indication is insufficient to trigger the multiplier 12 or the other electronic circuitry 18. For this purpose the operator pulls the trigger 20 which is connected to the intensity grid of the cathode-ray tube of the display to greatly increase the brightness of the beam during "acquisition" period. The increase in the light energy of the target spot is then sufficient to produce a desired signal output for the system.

Thus, in one channel, the device originates and projects a light ring which is used for aiming, and simultaneously in a second channel it focuses any light spot within the light ring onto the photo-multiplier for activating a circuit. While two light-insulated light-conducting channels are used, the system requires only one lens for projecting the ring in one direction, and for focusing the spot in the opposite direction. The small ring projected by the device indicates the proper positioning of the detector for light pick-up from a specific target indication, and the pick-up is properly aimed on the target when the spot of illumination is wholly within the periphery of the ring of the aiming light. Because of the arrangement of the two light-insulating channels, i.e., the rod 24 and the pipe 28 in combination with the lens 60, there is no interference between channels and any random reflected light impinging upon the lens 60 is reduced by using a coated lens.

It will be apparent to persons skilled in the art that the invention is susceptible of many modifications and adaptations. For example, the particular pistol configuration of the casing is not required, and a wand or other type configuration may be preferable. Moreover, in some applications it may be preferable that the electronic circuitry be mounted separate from the detector device. While a photo-multiplier has been illustrated and described, in appropriate circumstances a photoelectric cell, an infrared cell, or other type of radiation detector may be preferable. Furthermore, the operation may be modified in various ways. For example, the lamps 44 and the photo-multiplier 12 may normally be de-energized, and the lamps being first illuminated for aiming purposes, and the photo-multiplier thereafter being energized, thus avoid unintentional activation of the circuits. Therefore, it is intended that the scope of this invention be limited only by the appended claims as interpreted in the light of the prior art.

What is claimed is:

1. An optical system including a spot source of low intensity radiant energy;
   a radiant energy detector;
   a radiant energy conductor for conducting radiant energy originating from said spot of radiant energy to said detector to energize said detector;
   means for precisely positioning said conductor with respect to said spot of radiant energy, said means including a light conducting tube, said radiant energy conductor being positioned within and coaxially with respect to said tube;
   a source of light;
   and means for focusing said light from said source through said light conducting tube towards said surface into a ring of light, and for focusing said spot of radiant energy from said surface to said conductor, said conductor being precisely positioned when said ring of light surrounds said spot of radiant energy, the reflected light from said surface due to said ring of light being insufficient to energize said detector.

2. The invention as defined in claim 1 wherein said radiant energy is light, and wherein said conductor is a transparent rod positioned within said tube, and wherein means are provided for preventing the transmission of light energy between said conductor and said tube.

3. The invention as defined in claim 2 wherein said tube is transparent.

4. The invention as defined in claim 2, wherein said means for focusing said light energy from said spot onto said conductor, and for focusing the light from said source and said tube into a ring on said surface is a lens.

5. The invention as defined in claim 2 wherein the means for preventing the transmission of light between said conductor and said tube comprises a first white reflecting coating and a second opaque coating on said conductor.

6. The invention as defined in claim 5, and an electrostatic shield for said coated conductor.

7. The invention as defined in claim 4 wherein said lens is double convex.

8. In an optical system for detecting a low intensity spot of light, the combination comprising:
   a light detector;
   a light conducting cylindrical rod having one end adjacent said detector, said rod being coated first with a reflecting coat and second with an opaque coat, the ends of said rod being clear;

an electrostatic shield for said coated rod;

a lens for focusing radiations from said spot into the other end of said rod, said lens having its axis coaxial with said cylindrical rod and spaced from the other end of said rod a distance equal to the focal length of said lens;

means for precisely aiming said lens and said rod towards said spot, said means including a hollow light conducting tube having an internal bore, the exterior of said tube being coated first with a reflecting coat and second with an opaque coat, the interior surfaces of said tube being coated with a reflecting coat;

said coated rod and shield being firmly positioned within said internal bore, said other end of said rod extending from one end of said tube, the other end of said tube being enlarged and having at least one lamp receiving hole therein;

a lamp housing mounted on said one end of said rod;

at least one lamp supported from said housing and extending into said hole;

and means for illuminating said lamp whereby light from said lamp travels through said tube towards said spot whereby a ring of light is projected about said spot when said lens and said rod are aimed at said spot.

9. The invention as defined in claim 8 wherein said lamp housing is constructed of a heat conducting, electrical insulating material.

10. The invention as defined in claim 8 wherein said lens is double convex.

11. The invention as defined in claim 8 wherein said optical system is supported within a tubular housing constructed of an opaque, heat conducting, electrical insulating material.

References Cited in the file of this patent

UNITED STATES PATENTS

| | | |
|---|---|---|
| 2,420,716 | Morton et al. | May 20, 1947 |
| 2,816,705 | Thrall et al. | Dec. 17, 1957 |
| 2,838,683 | Munro | June 10, 1958 |
| 2,903,690 | Slack | Sept. 8, 1959 |
| 2,964,640 | Wippler | Dec. 13, 1960 |